United States Patent [19]

Nogossek et al.

[11] Patent Number: 5,182,115
[45] Date of Patent: Jan. 26, 1993

[54] DEVICE FOR COOLING, DRYING AND GRANULATING STRANDS

[75] Inventors: Alfred Nogossek, Würzburg; Jürgen Keilert, Kleinwallstadt, both of Fed. Rep. of Germany

[73] Assignee: Automatik Apparate-Maschinenbau GmbH, Fed. Rep. of Germany

[21] Appl. No.: 720,441

[22] PCT Filed: Jan. 5, 1990

[86] PCT No.: PCT/EP90/00025
§ 371 Date: Aug. 14, 1991
§ 102(e) Date: Aug. 14, 1991

[87] PCT Pub. No.: WO90/07408
PCT Pub. Date: Jul. 12, 1990

[30] Foreign Application Priority Data

Jan. 5, 1989 [DE] Fed. Rep. of Germany ....... 3900250

[51] Int. Cl.$^5$ .......................... B29B 9/00; B29C 47/00
[52] U.S. Cl. .............................. 425/71; 34/156; 264/143; 264/237; 425/72.2; 425/308
[58] Field of Search ................. 34/155, 156; 264/141, 264/143, 178 F, 237; 425/67, 68, 71, 72.1, 72.2, 308, 317, DIG. 230

[56] References Cited

U.S. PATENT DOCUMENTS 4,180,539 12/1979 Clarke ................................. 425/71
4,465,447 8/1984 Cheigh et al. ...................... 425/72.1
4,528,157 7/1985 Lettner et al. ........................ 425/71
4,632,752 12/1986 Hunke ................................ 425/72.1

FOREIGN PATENT DOCUMENTS 63-216710 9/1988 Japan .................................. 425/308

Primary Examiner—Jay H. Woo
Assistant Examiner—Scott Bushey
Attorney, Agent, or Firm—Banner, Birch, McKie & Beckett

[57] ABSTRACT

A device for cooling, drying, and granulating molten strands issuing from nozzles with an outlet channel, the upper end of which is located below the nozzles, a device, generating a current of cooling liquid over the outlet channel, a granulator arranged downstream of the outlet channel and with a dehydrating section that is arranged upstream of the granulator and in which the strands rest on a support provided with orifices for the unrestricted passage of the cooling liquid. The outlet channel in the region following the dehydrating section is provided with inlet nozzles that inject a current of fluid and that are so close together and arranged over such a length in its bottom that the strands are guided with respect to the bottom virtually without friction along the outlet channel in the granulator arranged at its lower end and with a degree of dehydration that enables immediate further processing.

20 Claims, 2 Drawing Sheets

DEVICE FOR COOLING, DRYING AND GRANULATING STRANDS

BACKGROUND AND SUMMARY OF THE INVENTION

The invention relates to a device for cooling, drying, and granulating molten strands issuing from nozzles and made, e.g., from thermoplastics, with an outlet channel, the upper end of which is located below the nozzles, a device, generating a current of cooling liquid over the outlet channel, a granulator arranged downstream of the outlet channel and with a dehydrating section that is arranged upstream of the granulator and in which the strands rest on a support provided with orifices for the unrestricted passage of the cooling liquid.

Such a device is known from the DE-PS 33 36 032. In this device the dehydrating section comprises zones of which the first zone in the flow direction leads to a water outlet and the second zone is pressurized with an air current, by means of which water clinging to the strands is largely sucked off. These two zones of the dehydrating section are arranged practically directly upstream of the granulator.

The invention is based on the problem of further improving the known device, described above, with respect to its drying efficiency and simultaneously giving the device especially good self-threading properties.

The invention accomplishes this in that the outlet channel in the region following the dehydrating section is provided with inlet nozzles that inject a current of fluid and that are so close together and arranged over such a length in its bottom that the strands are guided with respect to the bottom virtually without friction along the outlet channel into the granulator, arranged at its lower end, with a degree of dehydration that enables immediate further processing.

The result of inserting the region of the inlet nozzles guiding the current of fluid between the dehydrating section and the granulator is the combination of two effects. On the one hand, the strands are dried to the extent that they are processed by the granulator with a degree of dehydration that enables immediate further processing, i.e. the granules that are produced do not require any subsequent drying process. The current of fluid provides that the strands are subsequently guided virtually without friction over the bottom, a feature that is especially significant due to the lack of water, which, when present, acts to some extent as a lubricant. The virtually frictionless guiding of the strands in the region of the inlet nozzles provides that the strands, pushed forward by gravity or the current of cooling liquid, automatically obtain a tendency to self-thread, which is otherwise decreased in the area upstream of the granulator when cooling liquid is lacking.

The tendency for self-threading can be further intensified by sloping the inlet nozzles in the direction of motion of the strands.

Preferably a current of gas, in particular a current of air, is used for the current of fluid. It is also possible to use an inert gas, in particular nitrogen, which is frequently produced in chemical operations as a side product.

To be able to process especially moisture-sensitive substances, a powdery drying agent is added in an advantageous manner to the current of gas. Usually such a drying agent also has the effect of preventing the strands from sticking together. If such a drying agent is undesired for the further processing of the granules since said drying agent adheres to the manufactured granules, the outlet channel between the granulator and the region of the inlet nozzles guiding the current of fluid can be provided with perforations leading to a suction chute. Then a current of air sucked in through the suction chute and the perforations removes the powdery drying agent from the strands so that the strands are conveyed virtually without any drying agent into the granulator.

To increase the feed effect of the sloped inlet nozzles, feed nozzles for blowing a current of fluid against the strands in the direction of movement of the strands can be provided in an advantageous manner in the region of the inlet nozzles above the outlet channel. Preferably the same medium is used for this current of fluid as for the current of fluid directed through the inlet nozzles. These additional feed nozzles also increase the tendency towards self-threading. This is especially advantageous if the inlet nozzles provided in the bottom of the outlet channel pass vertically through the bottom.

To adapt the device to different drying and cooling needs, the region of the inlet nozzles guiding the current of fluid and/or the region upstream of the dehydrating section is/are lengthwise adjustable. To this end, a telescopic construction of the regions in question is especially suitable. In this manner it is possible to combine an especially long section guiding the current of cooling liquid with a shortened length of the region with the inlet nozzles for the current of fluid.

To obtain special drying, cooling or heating effects, the current(s) of fluid can be suitably moderated. Thus, for example, it is desirable to heat fiber-reinforced plastic strands by means of the current of fluid in order to thus remove the load from the granulator. Vice versa it is advantageous for granulating flexible strands to cool them prior to granulating, since in this case better granules are obtained.

BRIEF DESCRIPTION OF THE DRAWINGS

The figures show embodiments of the invention.

DETAILED DESCRIPTION OF THE PREFERRED EMBODIMENT

Figure 1:
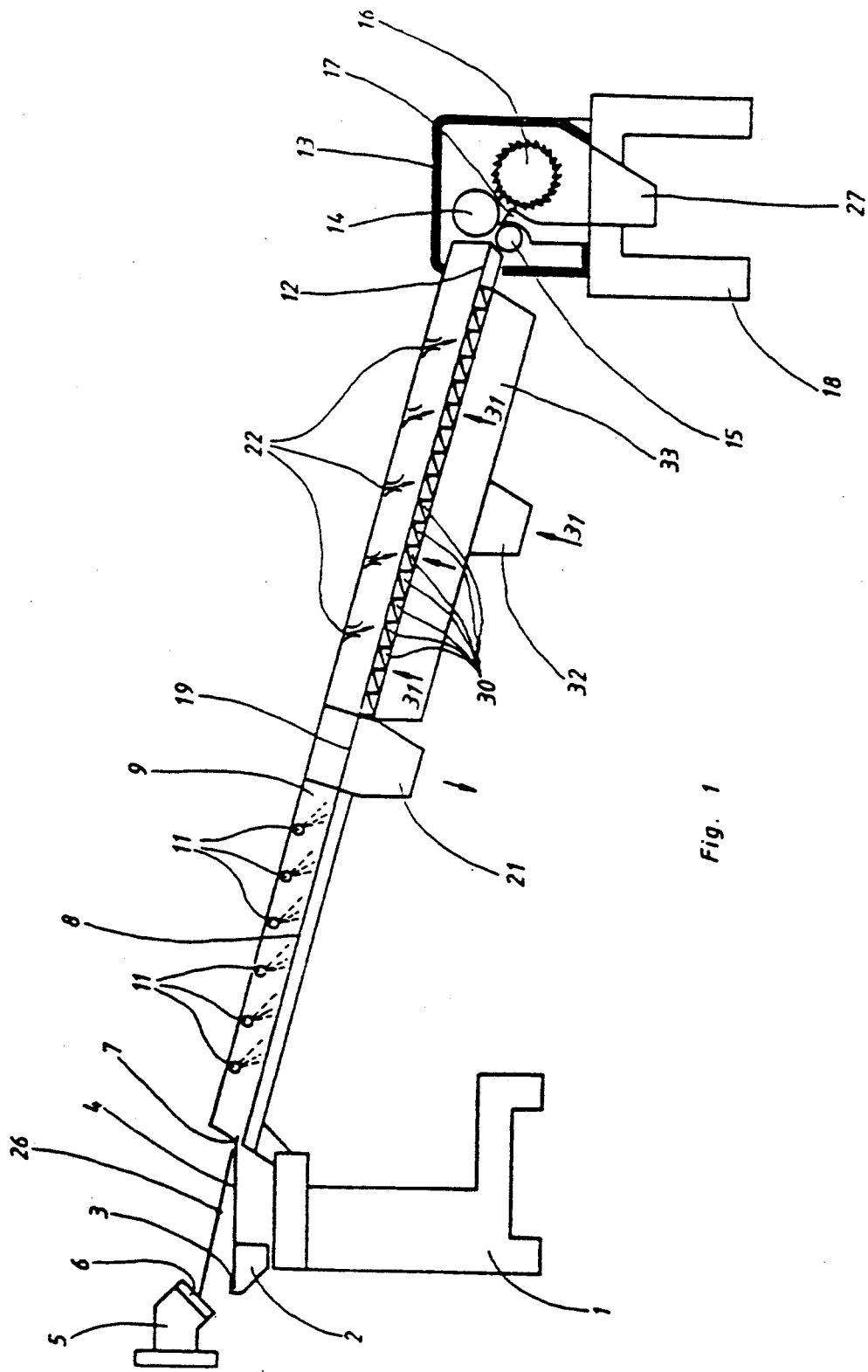
FIG. 1 is a side view of a principle presentation of the device with sloped outlet channel.

The device shown in FIG. 1 has a frame 1, on which the water tank 2 is attached, to which water is fed in known manner and serves here as the cooling liquid. The cooling liquid flows out of the slot nozzle 3 onto the outlet table 4 and over it to the right as a film of water, which carries along with it strands 26 which appear on the outlet table 4 and are made of an extrudable material, in this case thermoplastic. Nozzle set 5, of which one nozzle 6 is shown, is arranged above the outlet table 4. Thermoplastic in the molten state is fed to the set of nozzles 5 and forced out of nozzle 6. The design of such a set of nozzles is known. In the case of the device shown in FIG. 1, several nozzles 6 lie correspondingly side by side on a line.

Strands 26 issuing from nozzles 6 fall first on the outlet table 4 and are carried along by the film of water flowing over the outlet table 4 until said strands arrive by means of end 7 of the outlet table 4 at the outlet channel 8, on which they slide down in somewhat parallel arrangement. The outlet channel 8 is held in housing 9, which is braced with its left side by means of arm 10 on frame 1. Housing 9 has six cooling water spray nozzles 11, which, if necessary, spray additional cooling liquid, thus in particular water, on the outlet channel 8 and thus increase the cooling effect exerted on the plastic strands. The outlet channel 8 leads with its bottom end the plastic strands 26 sliding off over said outlet channel to granulator 13, which comprises the two feed rolls 14 and 15 and the rotor 16. Rotor 16 works against the stationary knife 17 serving simultaneously as the feed table. This construction of a granulator is well-known. Granulator 13 is mounted on stands 18.

The outlet channel 8 is provided in front of its bottom end 12 with inlet nozzles that are close to one another and inject a current of fluid, shown by arrow 31. This current of fluid is guided through chute 32 into tank 33, which is located below the region of the outlet channel 8 with inlet nozzles 30. Here an air current, which flows around the plastic strands 26, guided over this region of the outlet channel 8, and lifts off in such a manner from the bottom of the outlet channel 8 that the plastic strands 26 are guided virtually without friction, is used as the current of fluid. To this end the inlet nozzles 30 are provided in corresponding density.

The dehydrating section 19, beneath which the water outlet 21 is arranged, is provided between the region of the outlet channel 8 with the coolant spray nozzles 11 and the region with the inlet nozzles 30. The dehydrating section 19 comprises a screen, which forms here the bottom of the outlet channel 8. The cooling water supplied at the upper end to the outlet channel 8 drains largely through this screen in the region of the dehydrating section 19.

The region of the outlet channel 8 with the inlet nozzles 30 receives in this manner cooled plastic strands 26, which are largely freed of the cooling water. The residual water is removed to some degree from the plastic strands 26 by means of the current of air guided by the inlet nozzles 30, so that due to the length of the region with the inlet nozzles 30 the strands are fed to the granulator 13 with a degree of drying that enables immediate further processing. The granules produced by the granulator 13 fall then with this degree of drying out through the delivery chute 27 for further processing.

Inlet nozzles 30 are formed here by upwardly tilted slot or pelletizing nozzle, shown by the saw-tooth line drawing in FIG. 1. Such slot nozzles are known. However, it must be pointed out that inlet nozzles passing also vertically through the bottom of the outlet channel 8 can be used that, of course, do not give the current of air guided by said nozzles the tendency to act on the plastic strands 26 being led down. Such an additional conveying action can be obtained through the arrangement of feed nozzles 22 which are arranged above the inlet nozzles 30 and which aim a current of fluid, here also a current of air, tilted downwards at the plastic strands 26 being led down.

The device shown in FIG. 1 has a pronounced tendency for self-threading, a feature that is significant when starting the device and also in the case of the plastic strands possibly fracturing or tearing away. Since in the region of the inlet nozzles 30 the plastic strands are guided virtually without friction along the outlet channel 8, the subsequent pushing of the plastic strands 26 due to the feed effect of the cooling water automatically provides that the plastic strands are conveyed without any restrictions into the granulator 13. This tendency of self-threading is further reinforced by suitable inlet nozzles 30 and also by the feed nozzles 22.

Figure 2:
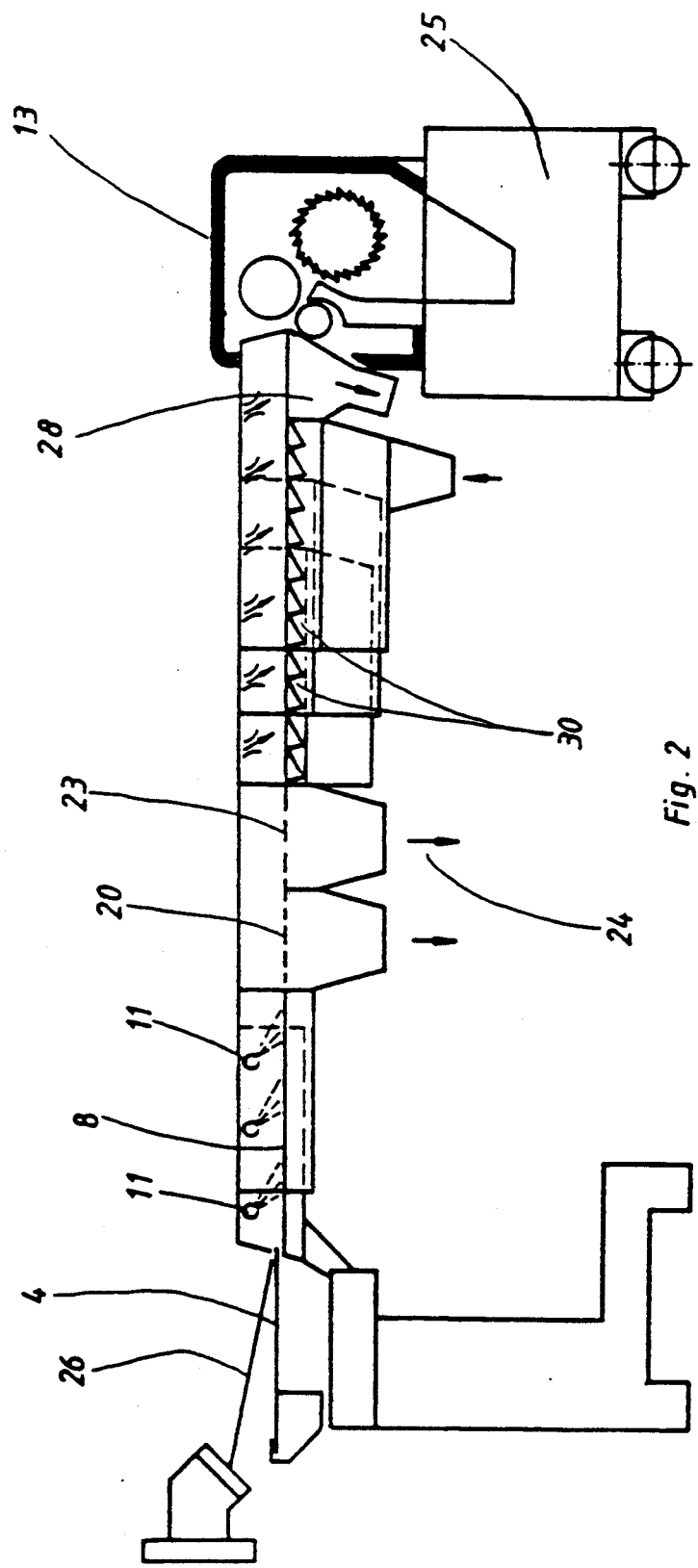
FIG. 2 shows the device with horizontal, lengthwise adjustable outlet channel.

The embodiment shown in FIG. 2 is a variation of the device according to FIG. 1. The device is provided with a horizontal outlet channel 8. Despite this horizontal direction of the outlet channel 8 it is possible to transport with it the plastic strands 26 into the granulator 13 so as to self-thread, since a pronounced feed action is exerted on the plastic strands 26 by means of the current of cooling water led over the outlet table 4 and by the action of the spray nozzles. Since in the relatively long region with the inlet nozzles 30 the plastic strands are largely prevented from rubbing on the bottom of the outlet channel 8 owing to the current of air flowing through there, the thrust given the plastic strands 26 in the region behind the outlet table 4 provides that the plastic strands 26 are transported reliably into the granulator 13.

In the device, according to FIG. 2, the dehydrating section (reference numeral 19 in FIG. 1) is further divided into two zones, namely zone 20 for the cooling water to drain and zone 23 through which a current of air is guided in the direction of the drawn arrow 24. This air current takes with it a significant portion of the residual water clinging to the plastic strands, so that plastic strands that are virtually freed of water are conveyed into the region of the outlet channel 8 with the inlet nozzles 30.

Here the outlet channel 8 is lengthwise adjustable both in the region behind the outlet table 4 and in the region of the inlet nozzles 30, a feature that is indicated by the telescopic construction of these regions. These two regions can thus be pushed into one another and pulled out of one another, thus enabling an optimal adjustment to the operating conditions that are demanded from time to time. These operating conditions depend in particular on the plastic to be processed.

To be able to compensate for the lengthwise modification in the outlet channel 8 in the region of the granulator 13, granulator 13 is arranged on the car 25, which rides along by a corresponding length in accordance with the extension or reduction of the outlet channel 8.

In the device shown in FIG. 2 a suction chute 28, which acts analogously to the suction in region 23, is arranged directly upstream of the granulator 13 at the bottom of outlet channel 8. Correspondingly the bottom of outlet channel 8 is designed here as a screen. Suction takes place in the direction of the drawn arrow. The arrangement of this suction chute 28 is logical if a powdery drying agent, e.g., talcum, that is to be removed prior to granulation, is added to the current of air supplied by the inlet nozzles 30. In this manner the drying agent can then unfold its effect in the region of the inlet nozzles 30. To the extent it still adheres to the strands 26, it is virtually removed by means of the suction chute 28.

We claim:

1. A device for cooling, drying, and granulating molten strands issuing from nozzles, said device comprising an outlet channel having an upstream end, a downstream end and a bottom extending from said upstream end to said downstream end, the upstream end of which is located below the nozzles, means for generating a current of cooling liquid over the outlet channel, and a granulator arranged downstream of the outlet channel, said channel including a dehydrating section that is arranged upstream of the granulator and in which the strands rest on a support provided with orifices for providing unrestricted passage of the cooling liquid, the outlet channel further including a region following the dehydrating section, said region being provided with inlet nozzles that inject a current of fluid upward through said outlet channel, said inlet nozzles being so close together and arranged over such a length in said bottom of said outlet channel so that the strands are guided with respect to the bottom virtually without friction along the outlet channel and into the granulator with a degree of dehydration that enables immediate further processing.

2. A device as claimed in claim 1, wherein the inlet nozzles are sloped so as to point at least partially in a direction generally toward said downstream end of said channel.

3. A device as claimed in claim 1, wherein the current of fluid injected by said inlet nozzles is a current of gas.

4. A device as claimed in claim 3, wherein said inlet nozzles further inject a powdery drying agent with the injected current of gas.

5. A device as claimed in claim 1, wherein the outlet channel between the granulator and the region of the inlet nozzles is provided with perforations leading to a suction chute.

6. A device as claimed in claim 1, further including feed nozzles for blowing a second current of fluid against the strands in a general direction toward said downstream end of said channel, said feed nozzles are provided in the region of the inlet nozzles above the outlet channel.

7. A device as claimed in claim 1, wherein at least one of the region of the inlet nozzles and the region upstream of the dehydrating section is lengthwise adjustable.

8. A device for cooling, drying, and granulating molten strands issuing from nozzles, said device comprising:
a channel having an upstream end and a downstream end, said channel defining a bottom for receiving the strands for movement from said upstream end to said downstream end, said channel further defining a cooling section, an initial drying section and a final drying section, said bottom of said channel in said cooling section being substantially imperforate for supporting a cooling liquid, said bottom of said channel in said initial drying section having a perforate construction through which said cooling liquid is substantially removed from said channel, and said bottom of said channel in said final drying section having openings through which a drying fluid is passed;
means for supplying the cooling liquid to said cooling section of said channel to cool the molten strands;
means for passing the drying fluid upward through said openings in said bottom of said channel in said final drying section so that said strands are further dried and so that said strands are passed along said channel toward said downstream end of said channel without incurring significant frictional resistance with respect to the bottom of said channel; and
a granulator adjacent said downstream end of said channel for granulating said strands.

9. A device as claimed in claim 8, wherein said means for passing said drying fluid into said final drying section injects the drying fluid in a direction inclined generally toward said downstream end of said channel.

10. A device as claimed in claim 8, wherein said openings through which said drying fluid is passed includes a series of openings defined along a length of said bottom of said channel in said final drying section.

11. A device as claimed in claim 8, further including means for supplying a powdery drying agent into said drying fluid passed through said openings in said bottom of said channel in said final drying section.

12. A device as claimed in claim 11, further including a suction chute located before said granulator and means for applying a suction through said suction chute so that said powdery drying agent is substantially removed from the strands.

13. A device as claimed in claim 8, wherein at least one of said cooling section and said final drying section of said channel has an extendible length.

14. A device as claimed in claim 8, further including a plurality of fluid nozzles located above said bottom of said channel in said final drying section, said fluid nozzles being constructed so that each directs a flow of drying fluid in a direction generally toward said downstream end of said channel.

15. A device as claimed in claim 8, further including means for suctioning a fluid from said initial drying section of said channel in a direction generally transverse to said bottom of said channel to further aid in removing the cooling liquid from said channel.

16. A device as claimed in claim 8, further including means for applying a suction in said initial drying section of said channel in a direction generally perpendicular to said bottom of said channel, said device further including a pair of chutes located beneath said perforate bottom construction of said channel, one of said chutes being located upstream relative to the other chute to receive and remove said cooling liquid from said channel, the other chute being positioned adjacent thereto for applying suction in said initial drying section.

17. A device for cooling, drying, and granulating molten strands issuing from nozzles, said device comprising:
a channel having an upstream end and a downstream end, said channel further defining a bottom for receiving the strands for movement therealong from said upstream end to said downstream end;
means for generating a current of cooling liquid over said channel adjacent said upstream end;
means for removing the cooling liquid in said channel;
means for injecting a drying fluid upward from said bottom of said channel adjacent said downstream end so that said strands move toward said downstream end without incurring significant frictional resistance with respect to said bottom of said channel; and
a granulator adjacent said downstream end of said channel for granulating the strands passed thereto through said channel.

18. A device as claimed in claim 17, further including means for applying a suction in said bottom of said channel near said means for removing said cooling liquid to effect at least partial drying of the strands.

19. A device as claimed in claim 17, further including means for supplying a powdery drying agent into said drying fluid injected upward from said bottom of said channel.

20. A device as claimed in claim 19, further including means for removing the powdery drying agent from the strands.

* * * * *